United States Patent
Galligan et al.

(10) Patent No.: US 10,402,573 B1
(45) Date of Patent: Sep. 3, 2019

(54) BREACH RESISTANT DATA STORAGE SYSTEM AND METHOD

(71) Applicants: Matthew Galligan, Delran, NJ (US); Nhan Nguyen, Huntingdon Valley, PA (US); Timothy W. Degnan, Ambler, PA (US)

(72) Inventors: Matthew Galligan, Delran, NJ (US); Nhan Nguyen, Huntingdon Valley, PA (US); Timothy W. Degnan, Ambler, PA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/124,514

(22) Filed: Sep. 7, 2018

(51) Int. Cl.
*G06F 21/60* (2013.01)
*H04L 9/08* (2006.01)
*H04L 29/06* (2006.01)

(52) U.S. Cl.
CPC ............ *G06F 21/60* (2013.01); *H04L 9/0819* (2013.01); *H04L 63/0807* (2013.01); *G06F 2221/2107* (2013.01)

(58) Field of Classification Search
CPC ............. G06F 21/60; G06F 2221/2107; H04L 63/0807; H04L 9/0819
See application file for complete search history.

(56) References Cited

U.S. PATENT DOCUMENTS

| | | | | |
|---|---|---|---|---|
| 8,621,271 | B2 * | 12/2013 | Grube | G06F 3/0619 |
| | | | | 714/6.32 |
| 8,826,019 | B2 * | 9/2014 | Shablygin | G06F 21/34 |
| | | | | 713/168 |
| 9,413,735 | B1 * | 8/2016 | Hird | H04L 63/08 |
| 9,430,655 | B1 * | 8/2016 | Stockton | G06F 21/602 |
| 9,881,177 | B2 * | 1/2018 | O'Hare | G06F 21/6218 |
| 9,904,788 | B2 * | 2/2018 | Kumar | H04L 9/0825 |
| 9,922,063 | B2 * | 3/2018 | Resch | G06F 21/6218 |
| 10,180,912 | B1 * | 1/2019 | Franklin | G06F 12/1408 |
| 2003/0026432 | A1 * | 2/2003 | Woodward | H04L 9/085 |
| | | | | 380/278 |
| 2005/0273629 | A1 * | 12/2005 | Abrams | G06F 21/10 |
| | | | | 713/189 |
| 2009/0077379 | A1 * | 3/2009 | Geyzel | H04L 9/085 |
| | | | | 713/170 |

(Continued)

*Primary Examiner* — Darren B Schwartz
(74) *Attorney, Agent, or Firm* — Naval Information Warfare Center, Pacific; Kyle Eppele

(57) ABSTRACT

A breach resilient data storage system and method which encrypts, fragments, and stores data across a plurality of data stores, thereby requiring data being retrieved to be retrieved, recombined and decrypted before being accessible. The breach resilient data storage system and method includes, a plurality of storage containers, a client device from which data may be securely stored and securely stored data may be accessed, and a storage coordinator and a key keeper which track the encryption data and the placement and retrieval of fragmented data across the storage containers. Because the encrypted data is stored in fragmented bits, with none of the storage containers knowing what it is storing or having complete access to the complete set of data, a single compromised node in the system cannot be used to compromise the entire system or access any data.

12 Claims, 3 Drawing Sheets

(56) References Cited

U.S. PATENT DOCUMENTS

| | | | |
|---|---|---|---|
| 2009/0097661 A1* | 4/2009 | Orsini | H04L 9/083 380/279 |
| 2009/0116649 A1* | 5/2009 | Perlman | H04L 9/085 380/277 |
| 2010/0054481 A1* | 3/2010 | Jajodia | H04L 9/085 380/284 |
| 2010/0299313 A1* | 11/2010 | Orsini | H04L 9/085 707/652 |
| 2010/0313036 A1* | 12/2010 | Lumb | G06F 21/602 713/189 |
| 2011/0246766 A1* | 10/2011 | Orsini | G06F 11/1076 713/160 |
| 2012/0066517 A1* | 3/2012 | Vysogorets | G06F 21/34 713/193 |
| 2012/0066752 A1* | 3/2012 | Vysogorets | G06F 21/34 726/7 |
| 2012/0066757 A1* | 3/2012 | Vysogorets | G06F 21/34 726/9 |
| 2012/0243687 A1* | 9/2012 | Li | H04L 9/085 380/277 |
| 2013/0212704 A1* | 8/2013 | Shablygin | G06F 21/6218 726/28 |
| 2014/0201541 A1* | 7/2014 | Paul | G06F 21/6245 713/193 |
| 2016/0350551 A1* | 12/2016 | Chang | G06F 12/1408 |
| 2017/0093564 A1* | 3/2017 | Bernat | H04L 9/0822 |

* cited by examiner

BREACH RESISTANT DATA STORAGE SYSTEM AND METHOD

STATEMENT OF GOVERNMENT INTEREST FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif. 92152; telephone (619) 553-5118; email: ssc_pac_t2@navy.mil. Reference Navy Case No. 103760.

BACKGROUND OF THE INVENTION

Field of the Invention

This invention relates generally to a data storage system and method for protecting data. More specifically, the invention can pertain to a data storage system and method for protecting data while the system is online and data being accessed.

Description of the Prior Art

In recent times, there have been numerous reports of large scale data breaches, with each report seemingly relating to a breach that is larger than the prior report. Accordingly, there is an obvious need for a fundamental change in how data is stored and, more generally, the approach taken in building data storage systems. Indeed, a shift from a convenience first approach to an approach that addresses security first and foremost is long overdue.

In many instances, data at rest encryption, encrypted databases, and other approaches have been used to help prevent back end data breaches. As used in the specification, the term "back end" can mean systems components for data storage or communication. The back end can generally consist of a server, an application, and a database. By contrast, the "frontend" of an application can be taken to mean everything that the user interacts with. This includes can design features in the website or application, links, transactions, images, content, and others. Data at rest encryption can prevent offline data breaches, such as when storage drives are physically removed from the premises. The data at rest encryption strategies in the prior art can be effective at protecting data at rest. However, once the system is online, these approaches do not provide any protection. Data at rest encryption can offer very little or even no protection from compromised account login or remote hacking.

Often, a system can be compromised by attackers or malicious authorized users who can obtain access to sensitive data outside of intended uses or protocols. For example, an attacker may compromise a system (gaining unauthorized control) and then dump the contents of an affected data storage system to a remote system, for exploitation later. Thus, there is a need for a method to protect data against online dumping or mass querying when the system is online and data at rest protection provides no benefit.

In view of the above, it can be an object of the present invention to provide a breach resilient and tamper proof data storage system and method that can provide security for the data storage system while the system is online as well as offline. Another object of the present invention can be to provide a breach resilient data storage system and method that can prevent authorized user, system administrators and unauthorized attackers from compromising the system data by accessing the back-end storage of a particular data system, where a user compromising a client (holding access credentials) can potentially request all data in the system (because the system storage map can contain all 'real' storage locations. Still another object of the present invention can be to provide a breach resilient data storage system and method that can be easy to implement in a cost effective manner.

SUMMARY OF THE INVENTION

The present disclosure describes a breach resilient data storage system and method which encrypts, fragments, and stores data across a plurality of data stores, thereby requiring data being retrieved to be retrieved, recombined and decrypted before being accessible. In accordance with one embodiment of the present disclosure, a breach resilient data storage method includes: providing a plurality of storage containers, wherein each of the plurality of storage containers are at least one of physically separate and logically separate from the other storage containers in the plurality of storage containers. The method further includes transmitting by a client device a storage request relating to data to be stored to a storage coordinator, wherein the client device is at least one of physically separate and logically separate from the plurality of storage containers. The method also includes processing by the storage coordinator the storage request. Following the processing of the storage request, the method includes generating an encryption key; encrypting the data to be stored by the client device using the encryption key; splitting by the client device the encrypted data to be stored into encrypted data fragments; and sending by the client device each of the encrypted data fragments to at least one storage container among the plurality of storage containers for storage.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE INVENTION

Figure 1:
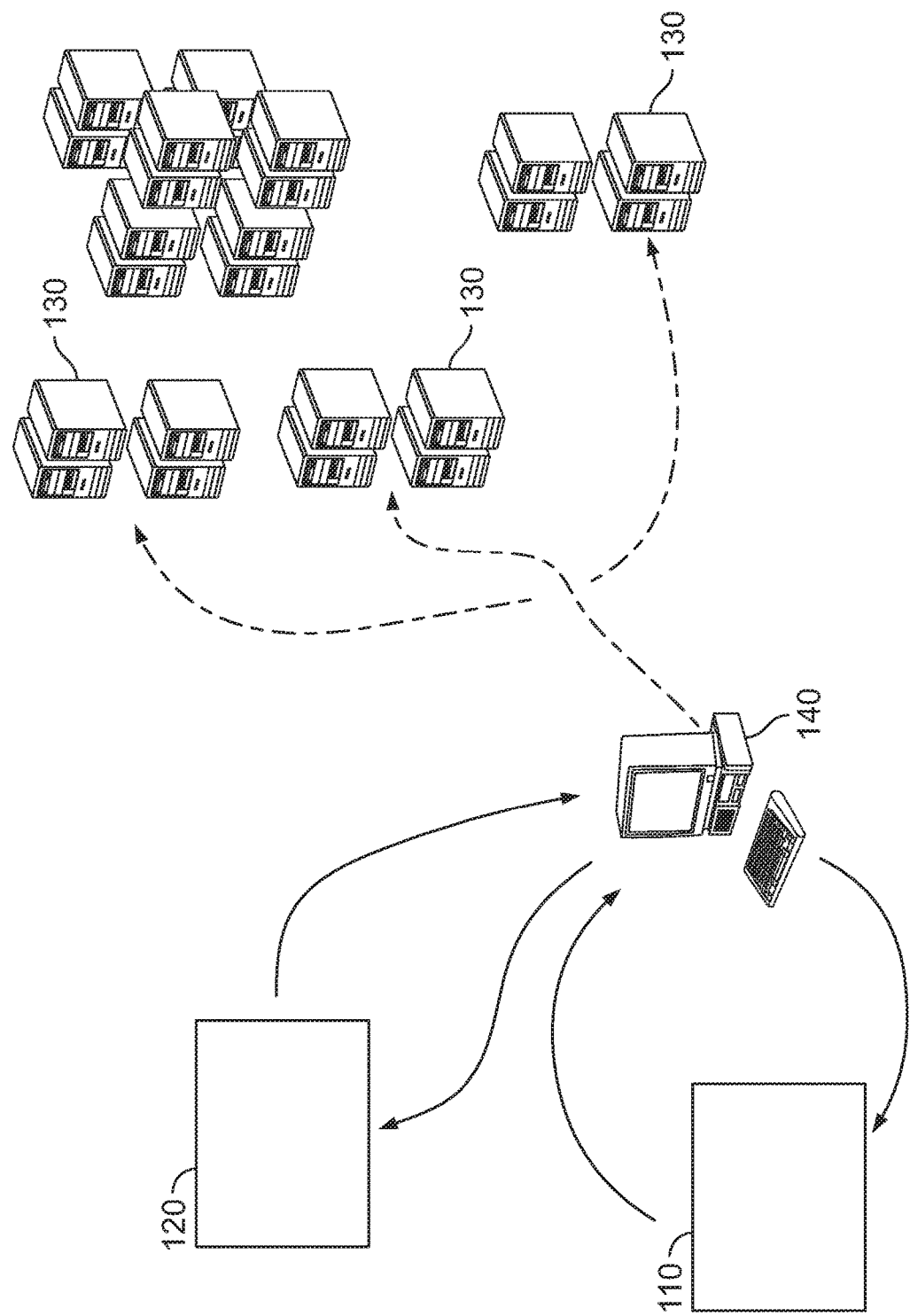
FIG. 1 can be a schematic showing the interaction of the nodes of a breach resilient data storage system built in accordance with the present disclosure.

Described herein is a breach resilient data storage system and method wherein data is first encrypted and then shredded into small blocks for storage on physically separate data stores. There may be N nodes, a key keeper, a storage coordinator, and N-2 data storage nodes. It should be appreciated that any of the N nodes can be the key keeper, storage coordinator or storage node. The present disclosure can employ intentionally computationally expensive cryptographic methods coupled with a large minimum data set (baseline noise is used to pre-populate the data set) to remove any realistic likelihood of brute force attacks (i.e., attacks using automated software to generate a large number of consecutive guesses as to the value of the desired data) when an attacker has less than all N data sets available to them.

In practicing the systems and method of the present invention, the use of a properly designed authentication service as known in the prior art is assumed; allowing only authenticated user access to the system and preventing all the services or components of the data storage from direct data exchange with each other. Each node, excepting the storage coordinator 110 (See FIG. 1), does not know of the other nodes N in the system, nor does it have access to these other nodes. Moreover, each node N has no knowledge of the data that it holds, only that it holds pieces of "some" data. When this assumption is warranted, if the breach resilient data storage systems as disclosed here is used, an attacker cannot obtain data from the other nodes using a compromised node; all of the components of the breach resilient data storage system must be subverted before the stored data can be interpreted.

As an example of the above, if there are three (3) distributed data servers used in an implementation, then a total of five (5) systems, namely the three (3) data servers, the storage access coordinator, and the key keeper system, must be subverted to retrieve the stored data. Such an architecture also provides a significant barrier to intentional or accidental leakage of offline data (for example, lost hard drives, dumping all available data on a system, and so forth).

In the breach resilient data storage system and method described herein, each storage node does not know what it is storing, nor do any of the nodes have access to the complete set of data. Dumping a particular storage node results in random bits of data with no value, as they are fragments of the encrypted data and useless without the complete set.

To prevent brute force attacks, a large initial data set may be used (for example, a million randomly generated chunks). Furthermore, conventional randomized insertion protocols, such as with a hash table or binary tree, can be employed to avoid, for example, appending all new data to the end of a database file. In addition to the large data set, a significantly large key size or other intentionally complex computational requirement can be used to ensure that randomly combining data chunks and decryption keys is unfeasible within the foreseeable future of computing.

For example, using five (5) data storage nodes, one (1) key storage node, and a minimum record size of 100,000, can result in $10^{30}$ possible combinations. Using a conventional workstation continuously combining and decrypting the blocks randomly, in one such configuration, brute force attacks would take approximately $3.17 \times 10^{19}$ years to decrypt the data with today's existing computation capability. With this same non-limiting example, but with a 2048-bit key, it would take $7.61 \times 10^{21}$ years to decrypt data that has been encrypted using the systems and methods, with the state-of-the-art computation speed and capability It should be appreciated that larger or smaller minimum data set sizes or different algorithms/key sizes can allow for this level of security to be adjusted to the appropriate level required and/or desired for a specific application (for example, if more speed or more security is required).

In addition, as each decryption is computationally expensive, even with authorized access, dumping massive amounts of data can be costlier, and can take more time. And this computational expense can be greatly increased by using slower/more expensive encryption algorithms and/or much larger key sizes.

Figure 2:
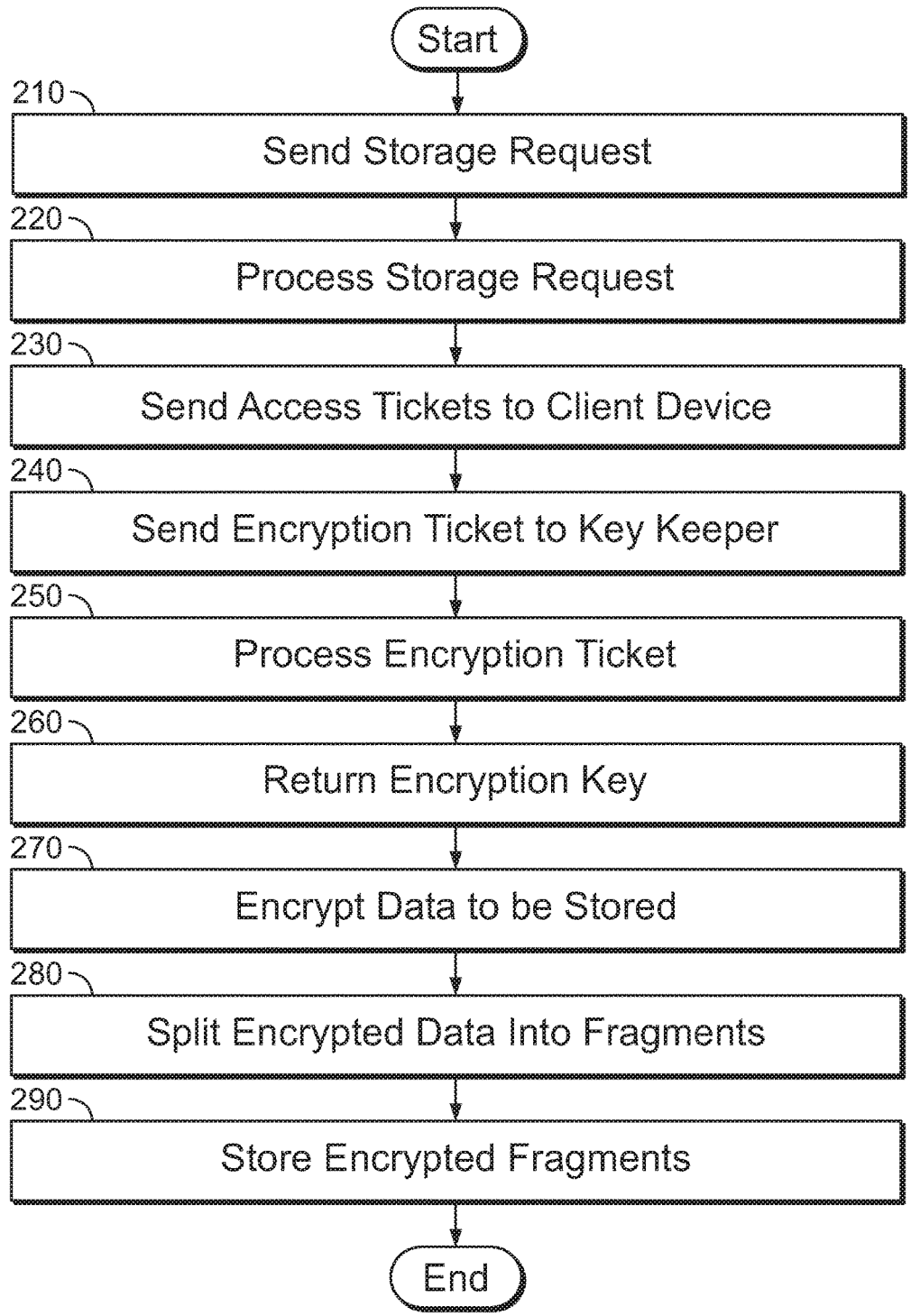
FIG. 2 can show a process for storing data in a breach resilient data storage system using the system of FIG. 1, in accordance some embodiments of the present invention; and, FIG. 3 can show a process for retrieving data in a breach resilient data storage system using the system of FIG. 1, in accordance several embodiments of the present disclosure.
Figure 3:
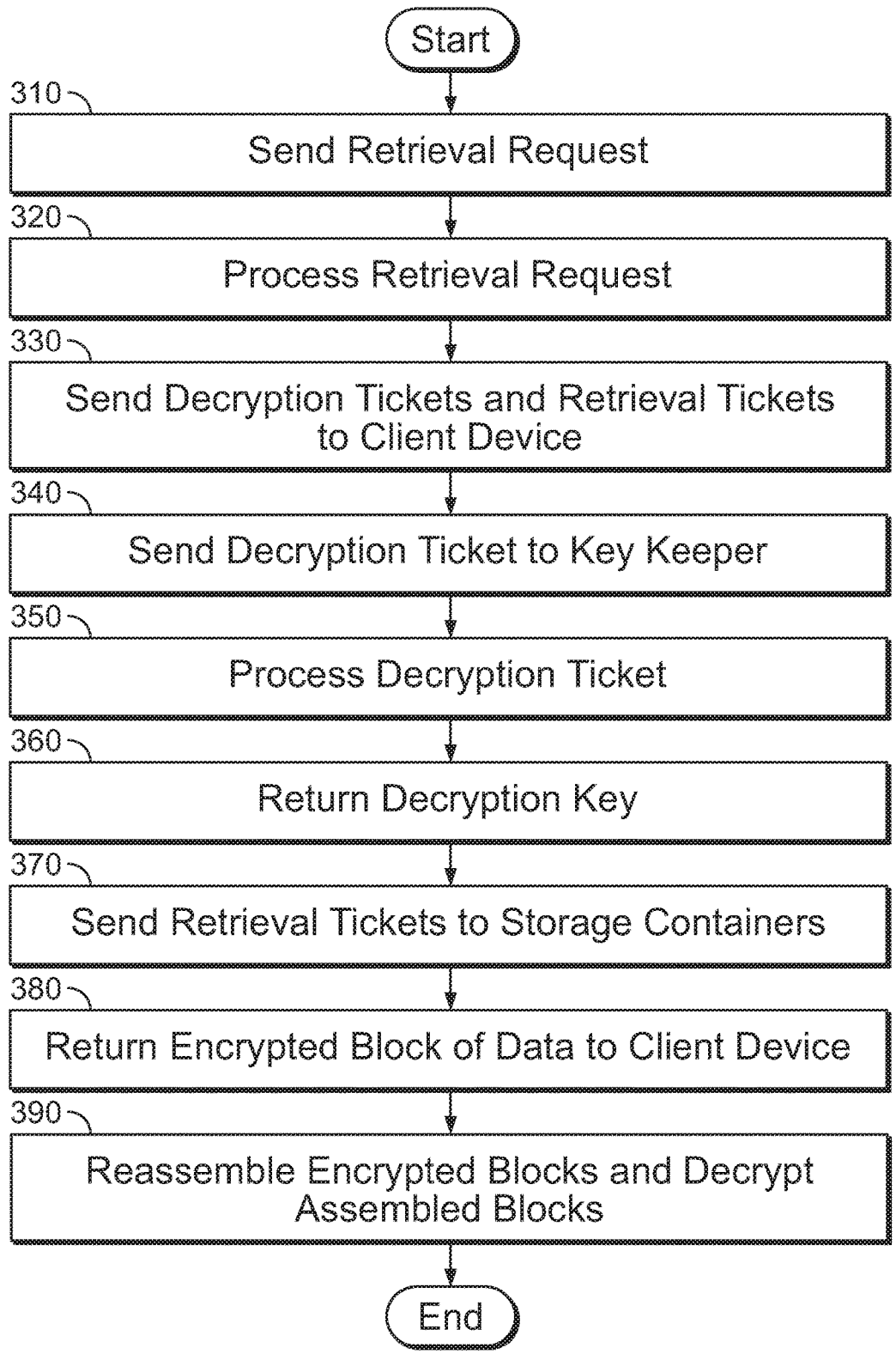

Referring now to FIGS. 1, 2, and 3, a breach resilient data storage system and method that employs N number of nodes (i.e., a physical or virtual system/device connected to a network) will include a storage coordinator 110 which can function as a storage access controller, a key keeper 120 which can function as a cryptographic key generator and store, and N−2 data storage containers 130 which can provide distributed data storage. Users can access the breach resilient data storage system through a client device 140, and each node N (110, 120 or 130) in the breach resilient data storage system may respond to authorized requests (as defined below) from the client device 140 and is not able to communicate directly with the other nodes N.

The storage coordinator 110, key keeper 120, and client device 140 may be defined as a physically separated computer system and/or a logically separated (in this specification, logically separated can be taken to mean portions of a computer system that may physically reside on the same computer system, but that are separated through software instructions that reside on the system). Each of the data storage containers 130 may be defined as a physically and/or logically separated computer data storage server or other data storage system.

It is contemplated that each of these nodes may be communicatively connected to each other and to the client device 140 through a bus or a computer network, such as, but not limited to, the Internet or similar type of spatial area network, a combination thereof or any other type of network of nodes N as known in the prior art.

It is contemplated that in any event, breach resilient data storage system and method in accordance with the present disclosure will include greater than two (2) nodes N.

When each of the storage containers 130 are initialized, each is registered with the storage coordinator 110. These nodes each save a portion of data such as a social security numbers, multimedia, or other sensitive information desired to be protected. Within a storage container 130, records can be identified by a unique identifier that is assigned and kept by the storage coordinator 110. No other piece of the system has knowledge of where the record is ultimately stored within a storage container 130. This identifier is used by the storage container 130 when storing or retrieving data.

The storage coordinator 110 can have an encryption key, such as asymmetric public keys or a shared symmetric key, that can be paired with each other node 120, 130 in the system, and that can be used to craft messages only readable by that node. This feature can prevent the client device 140 and the user from knowing where the fragments of data are actually stored, and any other party from intercepting this information.

The storage coordinator 110 can issue storage tickets that can include the specific storage container 130 where a piece of data will be kept, and the specific location where the data will be stored within that storage container 130. By properly encrypting this ticket, this data can only be read by that specific storage container 130. Additionally, the storage ticket can contain metadata for identifying the authenticity of the ticket, and that the issuer (the storage coordinator 110) is genuine.

In order to retrieve information, the client device 140 can submit a retrieval request, alongside the record identifier, to the coordinator 110. This retrieval request can contain the unique identifier (originally supplied to the storage coordinator 110, or generated by the storage coordinator 110), and can correspond to the data to be retrieved. The storage coordinator 110 can access the storage locations where the data has been previously stored, and can return a set of retrieval tickets to the client device 140. The client device 140 sends the appropriate retrieval ticket to each of the key keeper 120 and storage containers 130, thus retrieving the encrypted and shredded data. The client device 140 can also receive the correct way to re assemble these data pieces and the needed decryption key from the storage coordinator 110.

The breach resilient data storage system and method could be used to store entire tables worth of data, but the implementation makes it infeasible to do a table scan (i.e., a sequential scan wherein each row of a table under scan is read in a sequential (serial) order and the columns encountered are checked for the validity of a condition). Thus, the breach resilient data storage system and method can be mostly considered as more appropriate for individual bits of data that are not attached to a larger record.

To protect a configuration of the breach resilient data storage system and method once initialized from unauthorized change, a system administrator for the breach resilient data storage system may create a signed configuration file. The configuration file is available to the client device 140 and each node in the breach resilient data storage system. The configuration file can be verified by every component in the breach resilient data storage system, but cannot be altered by these components.

In order to store information, the client device 140 can submit a storage request, alongside the record identifier to the storage coordinator 110. If no record identifier is supplied, the coordinator 110 can generate a unique record identifier to be used, that can correspond to the storage request.

Referring again to FIGS. 1 and 2, one example process through which the breach resilient data storage system can store data can be depicted. The process can begin with a client device 140 sending a storage request to the storage coordinator 110 as depicted by at step 210. This storage request can specify a unique record identifier and storage container 130 to be used when referencing this data in the future. When a storage request is received by the storage coordinator 110, the storage coordinator 110 processes the storage request at step 220. The step of processing the storage request can include the storage coordinator 110 creating access tickets for the key keeper 120 and for each storage container 130, which can be used to store fragments of the data corresponding to the storage request. The storage coordinator 110 can determine the location(s) in the storage container(s) 130 where the data fragments will be stored. The step of processing the storage request can also include the storage coordinator 110 determining which storage containers 130 will store the data fragments.

The access ticket for the key keeper 120 may be embodied by an encrypted encryption ticket that can be crafted by the storage coordinator 110 when the storage request is received. The encryption ticket may be used by the key keeper 120 to requisition a new encryption key by the client device 140. The information necessary to create a decryption ticket that corresponds to an encryption ticket being crafted is maintained as an entry in an index stored in a storage location map on the storage coordinator 110 for the storage request being processed.

The access tickets for the storage containers 130 may be embodied by individual storage tickets that are crafted by the storage coordinator 110 for each of the storage containers 130 when the storage request is received. Each storage ticket, which is encrypted such that it can only be read by the storage container 130 for which it was crafted, instructs the respective storage container 130 to store a data fragment in a particular location on that storage container 130. Each storage ticket also can include the network address of the storage container 130 for which it was crafted and an indicator specifying which data fragment from encrypted data that is split is to be sent to the storage container 130 which corresponds to the storage ticket. The client device 140 can read a portion of the storage ticket, indicating which storage container 130 is the intended recipient, and potentially the network address of this storage container 130.

The storage locations in the storage containers 130 are maintained in the storage location map, which can be located on the storage coordinator 110.

Once the access tickets for both the key keeper 120 (e.g., an encryption ticket) and the storage containers 130 (e.g., storage tickets) are created, the storage coordinator 110 sends the access tickets to the client device 140 at step 230. Then, the client device 140 sends the encryption ticket to the key keeper 120 at step 240. The key keeper 120 processes the encryption ticket at step 250. Processing the encryption ticket may include decrypting the encryption ticket, generating an encryption key, and storing the generated encryption key along with a corresponding decryption key in an encryption key table. The key keeper 120 then returns the generated encryption key to the client device 140 at step 260.

Upon receipt of the encryption key from the key keeper 120, the client device 140 encrypts the data to be stored using the encryption key from the key keeper 120 at step 270. The client device 140 can then split the encrypted data into fragments at step 280, with the number of fragments equaling the number of storage containers 130 in the particular implementation of the breach resilient data storage system being used, which may be determined by the number of storage tickets sent to the client device 140 (three in the embodiment illustrated in FIG. 1). Configurations other than the one-to-one configuration described above are certainly possible. The client device 140 can then send the encrypted fragments for storage to the respective storage containers 140 at step 290.

The client device 140 may store the encrypted fragments in the storage containers 130 by first transmitting a first encrypted fragment to one of the storage containers 130, along with the storage ticket crafted for that particular storage container 130, and then repeating this process for each storage ticket received and, by extension, each storage container 130. Upon storing one of the encrypted fragments, each storage container 130 may respond to the client device 140 that the encrypted fragment has been successfully stored (at a location known only to the storage coordinator 110 and the storage container 130 storing the fragment).

It is contemplated that the client device 140 may use the configuration file to obtain the network addresses of the nodes specified by the storage coordinator 110 in each of the access tickets in order to transmit the access tickets thereto.

Referring now to FIGS. 1 and 3, the process through which the breach resilient data storage system retrieves data can begin with a client device 140 sending a retrieval request to the storage coordinator 110 at step 310. This retrieval request can specify the unique record identifier for the record that is desired.

When a retrieval request is received by the storage coordinator 110, the storage coordinator 110 can process the retrieval request at step 320. The step of processing the retrieval request can include the storage coordinator 110 locating the record identifier or index in its storage location map and crafting retrieval tickets for each of the storage containers 130 identified as storing fragments associated with the storage location map entry. The step of processing the retrieval request can also include the storage coordinator 110 crafting a decryption ticket for the key keeper 120 using the entry that corresponds to the encryption ticket that is stored in the index in the storage location map.

The decryption ticket and retrieval tickets can be encrypted such that only the intended recipient can decrypt them (such as with public key encryption).

Once the decryption ticket and retrieval tickets are created, the storage coordinator 110 sends the decryption ticket and retrieval tickets to the client device 140 at step 330. Then, the client device 140 sends the decryption ticket to the key keeper 120 at step 340. The key keeper 120 processes the decryption ticket at step 350. Processing the decryption ticket may include decrypting the decryption ticket and retrieving the decryption key stored in the encryption key table associated with the record being retrieved. The key keeper 120 then returns the decryption key to the client device 140 at step 360.

Upon receipt of the decryption key from the key keeper 120, the client device 140 send the retrieval ticket to the storage container 130 for which the retrieval ticket was crafted at step 370, with each storage container 130 decrypting its retrieval ticket after it is received. After decrypting the retrieval ticket, each storage container 130 returns the encrypted block of data identified in the retrieval ticket to the client device 140 at step 380. After the encrypted blocks are received from each storage container 130 to which a retrieval ticket was sent, the client device 140 reassembles the encrypted blocks in the order specified by the storage coordinator 130 in the storage tickets and decrypts the data using the decryption key returned by the key keeper 120 at step 390.

It is appreciated that the breach resilient data storage system and method in accordance with the present disclosure may provide enhanced security because: (1) It can require multiple nodes to be subverted before data retrieval is possible; (2) It can prevent any single nodes data spillage from causing damage; (3) It can hide the underlying storage locations and schemes from the user (unlike in, for example, a clustered index, a specified index value does not in any way indicate where the data is stored); and, (4) It can require the data holder to process and encrypt the data, ensuring that none of the nodes actually see the unencrypted data (as the end user encrypts and shreds the data before any of the nodes receive it). In addition, due to the minimum data set size and cryptographic complexity, data does not necessarily need to be removed from the stores for it to be deemed inaccessible—simply deleting the index from the storage map will make the data irretrievable.

It is contemplated that the breach resilient data storage system and method in accordance with the present disclosure can be designed for sensitive data where disclosure would be damaging, such as with sensitive employee data or critical secrets. While there are drawbacks, such as a lower reliability since multiple nodes are needed for data storage, a larger backup footprint being needed since entire nodes would need to be replicated with minimal compression possible, and an increased performance impact due to the use of independent nodes and encryption methods, these are in no way inconsistent with an objective to shift from a convenience first approach to an approach that addresses security first.

It should be appreciated that the client device 140 and the other nodes N can mutually authenticate each other (through traditional means) each time they exchange data with each other. This can prevent situations where an intruder attempts to obtain (steal) an access ticket and pass it on without access to the node N in question, and can provide a further overall measure of security for the system.

In an alternate embodiment, a middleman service could perform most of the roles of the client device 140. In another alternate embodiment, the decryption key could be stored in a separate storage container, without any special indication that it is a key instead of a regular data block.

As an additional security measure, the client device 140 the client could use a secret (such as additional encryption key, passphrase, or other piece of data) that is not stored on the BRDS system to ensure that even when all BRDS nodes are compromised, the data set is not complete.

As an additional security measure, the key keeper 120 can create a random additional key of a specific length, that is required to decrypt a specific record. The time to 'brute force' this key can be tailored depending on the security requirements of the system. This can impose an additional cost (time, money, computing resources) that must be met even during a valid and authorized transaction.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of the preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of storing data in a breach resilient data storage system, comprising the steps of:
    providing a plurality of storage containers, wherein each of the plurality of storage containers are at least one of physically separate and logically separate from the other storage containers in the plurality of storage containers, and further wherein one of the plurality of storage containers is a storage coordinator and another of the plurality of storage containers is a key keeper;

transmitting by a client device a storage request relating to data to be stored to the storage coordinator, wherein the client device is physically separate and logically separate from the plurality of storage containers;

processing the storage request by the storage coordinator, the processing step including the steps of creating access tickets for the key keeper and each of the corresponding storage containers that are not the storage coordinator, and determining the selective splitting of the data into data fragments and the selective location of the data fragments at a corresponding said storage container that is not the key keeper nor the storage coordinator;

sending one of the access tickets to the client device as an encrypted encryption ticket, for further transmission to the key keeper as said encrypted encryption ticket;

sending each of the remaining access tickets to the client device as a plurality of storage tickets, for further transmission to a corresponding said storage container that is not the key keeper nor the storage coordinator as an individual said storage ticket;

preparing an encryption key, said preparing step being accomplished by the key keeper by decrypting the encrypted encryption ticket, generating the encryption key and a corresponding decryption key, and returning the encryption key to the client device;

encrypting by the client device the data to be stored using the encryption key;

selectively splitting the encrypted data into encrypted data fragments by the client device according to the processing step; and selectively locating the encrypted data fragments at a corresponding said storage container according to the processing step.

2. The method of claim 1, further comprising the step of notifying the storage coordinator that storage of the data fragments have been successfully stored, the notifying step being accomplished by each of the storage containers that has one of the data fragments assigned for storage.

3. The method of claim 1, further comprising the steps of:

retrieving the data that has been stored according to the storage request by transmitting a retrieval request for that data from the client device to the storage coordinator;

processing by the storage coordinator the retrieval request, the processing step including the steps of crafting retrieval tickets for each of the storage containers that are storing the data fragments, and crafting a decryption ticket for the key keeper;

sending by the storage coordinator the decryption ticket and the retrieval tickets to the client device;

sending by the client device the decryption ticket to the key keeper retrieving the decryption key that corresponds to the storage request, the decryption key having been generated by the key keeper during the preparing step;

returning the decryption key to the client device;

sending retrieval tickets to the plurality of storage containers each of the encrypted data fragments that relate to the data that has been stored to the client device;

in response to a retrieval ticket, sending the data fragments from the storage containers to the client device;

assembling by the client device the encrypted data fragments; and decrypting by the client device the assembled encrypted data fragments using the decryption key.

4. A breach resilient data storage system, comprising:

a plurality of storage containers, wherein each of the plurality of storage containers are physically separate and logically separate from each of the other storage containers in the plurality of storage containers;

a client device that is physically separate and logically separate from each of the plurality of storage containers;

wherein one of the storage container is designated a storage coordinator;

wherein one of the storage container is designated a key keeper device;

wherein said client device, storage coordinator, key keeper device, and plurality of storage containers are together configured to, following a storage request from the client device to the storage coordinator, cause a storage record in a dataset accessible to the client device to be encrypted, fragmented, and stored in fragments with each fragment a different said storage container among the plurality of storage containers that has not been designated as the storage coordinator nor the key keeper; and wherein said client device, storage coordinator, key keeper device, and plurality of storage containers are also together configured to, following a retrieval request from the client device to the storage coordinator, cause encrypted data fragments relating to a retrieval record in a dataset that has been stored to be sent from the plurality of storage containers to the client device, assembled together in a predetermined order, and decrypted so as to enable access to the retrieval record.

5. The breach resilient data storage system of claim 4, wherein the storage record is encrypted using an encryption key from the key keeper device, which was generated by the key keeper in response to the storage request.

6. The breach resilient data storage system of claim 4, wherein the assembled encrypted data fragments are decrypted using a decryption key from the key keeper device which was generated by the key keeper in response to the storage request.

7. The breach resilient data storage system of claim 4, wherein said client device, storage coordinator, key keeper device, and plurality of storage containers are together configured such that the storage record to be is fragmented after being encrypted.

8. The breach resilient data storage system of claim 4, wherein said client device, storage coordinator, key keeper device, and plurality of storage containers are together configured such that the encrypted data fragments are assembled before being decrypted.

9. The breach resilient data storage system of claim 4, wherein the storage coordinator is configured to, in response to the storage request, create an encryption ticket which enables the key keeper to generate the encryption key and a storage ticket for each of the plurality of storage containers which instructs the respective storage container to store at least one of said fragments of the encrypted storage record in a specified location on the respective storage container.

10. The breach resilient data storage system of claim 9, wherein the storage coordinator sends any encryption ticket and storage ticket created only to the client device.

11. The breach resilient data storage system of claim 9, wherein the storage record is encrypted using the encryption key from the key keeper device.

12. The breach resilient data storage system of claim 9, wherein said client device, storage coordinator, key keeper device, and plurality of storage containers are together configured such that the encryption ticket can only be decrypted by the key keeper and each storage ticket can only be decrypted by the storage container among the plurality of storage containers for which it was created.

\* \* \* \* \*